Sept. 17, 1946.　　　　F. JACOBSON　　　　2,407,745
ROTARY JOINT
Filed Aug. 9, 1944

INVENTOR
Franz Jacobson
BY
Kenyon & Kenyon
ATTORNEYS

Patented Sept. 17, 1946

2,407,745

UNITED STATES PATENT OFFICE 2,407,745

ROTARY JOINT

Franz Jacobson, New York, N. Y.

Application August 9, 1944, Serial No. 548,683

9 Claims. (Cl. 285—97.3)

1

This invention relates to coupling and more particularly to a rotary or swivel joint construction to be used with conduits conveying liquids, steam or gases under pressure or vacuum, at high or low temperatures. The joint is distinguished in having as principal features exceptional ease of rotation and all-metal construction.

A principal object of the invention is to provide a swivel joint that moves so easily that it swivels or rotates when attached to flexible hose and the latter is subject to twist. It thereby is capable of eliminating twist from hose when the latter is twisted and thereby greatly prolongs the life of the hose.

Another object of the invention is to provide a swivel joint of this character of all-metal construction that is easily moved or swivelled.

A further object of the invention is to provide a rotary joint in which the cost of maintenance is reduced by the elimination of any requirement for repacking and furthermore reduced by virtue of its low frictional resistance.

Yet another object of the invention is to provide a joint that is entirely leakproof and capable of lateral alignment with adjacent equipment.

To the accomplishment of the foregoing and such other objects as may hereinafter appear, the invention consists in the novel construction and arrangement of parts hereinafter described and then sought to be defined in the appended claims, reference being had to the accompanying drawing forming a part hereof, which shows merely for the purposes of illustrative disclosure a preferred embodiment of the invention, it being expressly understood, however, that changes may be made in practice within the scope of the claims without digressing from the inventive idea.

In the drawing in which similar reference characters denote corresponding parts:

Figure 1:
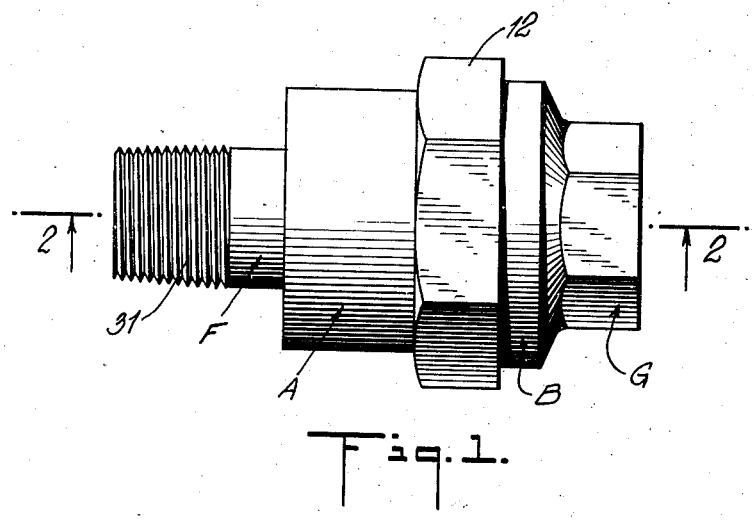
Figure 1 is an elevational view of the device.
Figure 2:
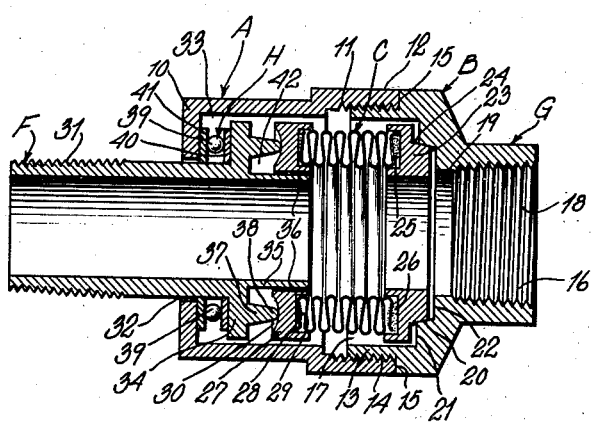
Fig. 2 is a sectional view taken along line 2—2 of Fig. 1 and viewed in the direction of the arrows.

Referring to the drawing, the principal elements comprise housing members A and B, an elastic, metallic element C, a rotary end member F, a stationary end member G, and anti-friction means H. These parts or members are assembled as will be presently described.

The housing member A consists of a tubular part having an inwardly extending annular flange 10 adjacent one end. The internal diameter of member A is slightly enlarged adjacent its opposite end and internally threaded at 11. The external face of the member A adjacent the

2 threaded portion 11 is suitably shaped, for example, as a nut 12, or has other suitable shape for the application thereto of a tightening tool.

The housing member B consists of a hollow part having a reduced portion 13 at one end threaded externally at 14. The threaded portion 14 is adapted to receive the internally threaded portion 11 of member A. An annular shoulder 15 on the member B limits the depth to which member A can be screwed onto member B. Other means for assembling or securing the housing members A and B together may be provided. The stationary member G is preferably integral with housing member B and is threaded internally at 16 for attachment to a pipe or other conduit (not shown). It may be otherwise provided with assorted means for attachment to pipes or conduits.

The housing member B is provided with an internal chamber 17 for a purpose to be presently described. This chamber communicates with the outlet 18 of stationary member G through an opening 19. The latter is provided with a tapered portion 20 adjacent its inner end. This portion 20 is so admeasured as to provide the shoulders 21 and 22 adjacent to its ends. The member G may be shaped externally to receive a suitable tightening tool.

An annular ringlike base or cap member 23 provided with a conical portion 24 substantially complemental to the tapered portion 20 is supported in the latter in leakproof manner as by a press fit. This cap member 23 is provided with a receiving groove 25 into which one end of the elastic, metallic, tubular element C is positioned and suitably attached as by brazing 26 or the like. The elastic or resilient tubular element C may be in the form of corrugated metallic tubing or bellows or of equivalent construction. An annular capping ring 27 is provided with an annular groove 28 into which the opposite end of member C extends and is suitably attached as by brazing 29 or the like. The capping ring 27 is provided with a concave groove 30 for a purpose to be presently described.

The rotary end member F is tubular and is threaded suitably at 31 for attachment to flexible tubing (not shown) or the like. The member F extends through the opening 32 formed by flange 10 of housing A into the chamber 33 of said housing member A. Said member F is admeasured in diameter to pass through said opening 32 with sufficient clearance to permit lateral offset of member F with respect to housing member A for a purpose to be presently described. An annular flange 34 extends laterally from the member F within the chamber 33. This flange is admeasured as to provide clearance between its outer surface and the walls of chamber 33, at least equal to the clearance between flange 10 and the surface of member F. A portion 35 of the member F having reduced external diameter extends beyond the flange 34 and into the opening within the ring or capping member 27, with a slight clearance 36. An annular flange or projection 37 extends longitudinally from the flange 34 and is provided with a rounded edge 38. This flange or projection 37 is admeasured in length so that its rounded edge 38 engages the surface of the concave groove 30 with circular substantially hair-line contact. Both the edge 38 and the surface 30 are highly polished to insure leakproof contact therebetween, and furthermore so that minimal frictional resistance is offered by this contact upon rotation of the end member F relative to ring member 27. The member C is so admeasured in length that, when the parts A and B are screwed together in assembly, said member C is put under compression and then the resiliency of member C urges the surface 30 of the ring member 27 into the aforesaid hair-line contact with edge 38. The surface 30 may be flat or have other shape than that shown.

The anti-friction means H of any suitable type, for example, ball bearings 39 within raceways 40, 41 is carried suitably on the member F between the flanges 10 and 27 and serves to reduce friction to a minimum between the parts A and F upon rotation of the latter.

The flange or projection 37, the cylindrical extension 35 of member F and the ring member 27 define an annular counter-pressure chamber 42 to which fluid or gas pressure prevailing within the resilient member C may be transmitted through the clearance 36. Thus it is possible to counteract the prevailing fluid or gas pressure within said member C which acts toward the rotary end member F, and thereby to reduce the pressure against concave surface 30 and proportionately reduce the frictional resistance between said surface and curved edge 38 when said member F is rotated or swivelled. The chamber 42 serves additionally as a storage chamber for a lubricant and seep proofing means such as grease or oil.

In operation, the housing part A is screwed tightly on to the part B, thereby putting the element C under compression. The compressed element C presses the surface 30 against the round edge 38 of the annular projection 37, thus forming a leak-proof joint between edges 38 and surface 30. The grease or lubricant in the chamber 42 further insures the seal by preventing seepage. The stationary end G may then be connected with stationary piping or other equipment, and the rotary end F connected with the rotating part of a machine or with flexible tubing or the like. Then fluid such as gas, steam or water can be conducted through the rotary joint without leakage at any point.

The leakproof nature of the joint is effected by providing high polish of the wearing edge 38 and surface 30, and by provision of the seep proofing lubricant within the chamber 42. Moreover, if steam is conveyed through the joint, some of it will penetrate through clearance 36 into chamber 42 and condense into water, forming a water seal. Whatever steam accumulates in chamber 42 is at lower pressure than the steam within element C because of the pressure-reducing action of the small clearance 36, so that there is no tendency for surface 30 to be moved away from edge 38. In addition, the press fit between the member 23 and part B at the portions 24, 20 insures leak proof connection between the parts at this point.

The easy rotation or swiveling action of member F is effected by the hair line contact between edge 38 and surface 30, the counter pressure action of pressure in chamber 42, the lubricant in said chamber, the anti-friction member H, and in addition by making the projection 37 and its edge 38 and the ring member 28 and its surface 30 of such metals, for example, bronze that offer minimum frictional resistance. This easy rotation of member F is such that any twist in flexible hose on rotation can automatically unwind.

The clearance 32 between member F and flange 10 of housing member A permits the rotary end F to be offset and aligned with parts to be connected to said end if the center line of adjacent equipment does not align with the center line through the joint. When this is done, the elastic or resilient construction of member C permits it to give sufficiently to permit lateral movement or alignment of said member F with the other part without causing leakage at the hair line contact between edge 38 and surface 30.

The construction described is an all-metal one, the parts, A, B, F, G and 23 being conveniently made of brass or other suitable metal, the part C being of spring brass or other suitable metal, the parts 27 and 37 being preferably of such metals that offer minimum frictional resistance, and the anti-friction means H being of metals usually used for such purposes.

While a specific embodiment of the invention has been described, it is to be understood that changes and variations in structural detail may be made and are contemplated within the scope of the claims. There is no intention of limitation to the exact details shown and described.

What is claimed is:

1. A rotary joint of the character described comprising metallic housing members adapted to be assembled together, a metallic member supported in rotary manner wtih respect to said housing members, and projecting outwardly of one thereof, an elastic metallic tubular element fixedly supported within and with respect to the other of said housing members, means secured to said element and providing a metallic anti-friction surface, metallic means projecting from said rotary member for engaging said surface with a line contact leakproof seal, said two last-named means and a portion of said rotary member defining a chamber, means to communicate pressure within the tubular element to said chamber, and metallic anti-friction means between said rotary member and said first of said housing members to permit free rotation of the rotary member.

2. A rotary joint of the character described comprising housing members adapted to be assembled together, a tubular member supported in rotary manner with respect to one of said housing members and projecting outwardly thereof, anti-friction means for so supporting said tubular member, a corrugated elastic tubular element, means for fixedly supporting one end of said element about an opening in a second of said housing members, means secured to the opposite end of said tubular element and providing an anti-friction surface, means projecting from said tubular member for engaging said surface with line contact to provide a leakproof seal, said two last-named means and a portion of said tubular member defining a chamber, means to communicate pressure within said tubular element to said chamber, and said chamber being arranged so that pressure communicated thereto counteracts said pressure within said tubular element that acts to force said surface bearing means against said projecting means, thereby tending to reduce friction at the said line contact.

3. A rotary joint of the character described comprising housing members adapted to be assembled together, a tubular member, anti-friction means for rotatably supporting said tubular member with respect to one of said housing members, means for attaching said tubular member to other parts, a corrugated tubular element, means for supporting one end of said element in leakproof manner about an opening in a second of said housing members, means for securing another part about said opening, ringlike means secured to the opposite end of said corrugated element and provided with an anti-friction, concave surface, a tubular portion extending from said tubular member into said ringlike member with small clearance therebetween, means projecting from said tubular member for engaging said concave surface with line contact to provide a leakproof seal, said tubular portion, projecting means and concave surface defining a chamber, said clearance providing a communication to said chamber for pressure from within said corrugated element, and said chamber being so arranged that pressure communicated thereto counteracts the pressure within said corrugated element that acts to force said concave surface against said projecting means, thereby reducing friction at said line contact.

4. A rotary joint of the character described comprising housing members adapted to be assembled together, a tubular member supported in rotary manner with respect to one of said housing members and projecting outwardly thereof, anti-friction means for so supporting said tubular member, a springy tubular element, means for fixedly supporting one end of said element about an opening in a second of said housing members, means secured to the opposite end of said tubular element and providing an anti-friction surface, means projecting from said tubular member for engaging said surface with line contact to provide a leakproof seal, said two last-named means and a portion of said tubular member defining a chamber, means to communicate pressure within said tubular element to said chamber, and said chamber being arranged so that pressure communicated thereto counteracts said pressure within said tubular element that acts to force said surface bearing means against said projecting means, thereby tending to reduce friction at the said line contact.

5. A rotary joint of the character described comprising housing members adapted to be assembled together, a tubular member supported in rotary manner with respect to one of said housing members and projecting outwardly thereof, a springy tubular element, means for fixedly supporting one end of said element about an opening in a second of said housing members, means secured to the opposite end of said tubular element and providing an anti-friction surface, means projecting from said tubular member for engaging said surface with line contact to provide a leakproof seal, said two last-named means and a portion of said tubular member defining a chamber, means to communicate pressure within said tubular element to said chamber, and said chamber being arranged so that pressure communicated thereto counteracts said pressure within said tubular element that acts to force said surface bearing means against said projecting means, thereby tending to reduce friction at the said line contact.

6. A rotary joint of the character described comprising housing members adapted to be assembled together, a tubular member, means for rotatably supporting said tubular member with respect to one of said housing members, a resilient metallic tubular element, means for supporting one end of said element in leakproof manner about an opening in a second of said housing members, ringlike means secured to the opposite end of said resilient metallic element and provided wtih an anti-friction, concave surface, a tubular portion extending from said tubular member into said ringlike member with small clearance therebetween, means projecting from said tubular member for engaging said concave surface with line contact to provide a leakproof seal, said tubular portion, projecting means and concave surface defining a chamber, said clearance providing a communication to said chamber for pressure from within said resilient metallic element, and said chamber being so arranged that pressure communicated thereto counteracts the pressure within said resilient metallic element that acts to force said concave surface against said projecting means, thereby reducing friction at said line contact.

7. A rotary joint of the character described comprising housing members adapted to be assembled together, a member supported in rotary manner with respect to said housing members, and projecting outwardly of one thereof, an elastic tubular element fixedly supported within and with respect to another of said housing members, means secured to said element and providing an anti-friction surface, means projecting from said rotary member for engaging said surface with a line contact leakproof seal, said two last-named means and a portion of said rotary member defining a chamber, means to communicate pressure within the tubular member to said chamber, anti-friction means between said rotary member and said first of said housing members to permit free rotation of the rotary member, and lubricant within said chamber.

8. An all-metallic rotary joint of the character described comprising assembled housing members, a tubular member supported rotatably with respect to said housing members, a resilient metallic tubular element supported within said housing members, and means for effecting a leakproof line contact seal between said tubular member and said tubular element while permitting free rotary movement of said tubular member with respect to said tubular element.

9. An all-metallic rotary joint of the character described comprising assembled housing members, a tubular member supported rotatively with respect to said housing members, a resilient tubular metallic bellows supported within said housing members in alignment with said tubular member, and means for effecting a leakproof line contact seal between said tubular member and said tubular element while permitting free rotary movement of said tubular member with respect to said tubular element.

FRANZ JACOBSON.